`US011457243B2`

(12) United States Patent
Yoshida

(10) Patent No.: US 11,457,243 B2
(45) Date of Patent: Sep. 27, 2022

(54) INTERPOLATION-FRAME GENERATION DEVICE AND METHOD

(71) Applicant: JVCKENWOOD CORPORATION, Yokohama (JP)

(72) Inventor: Atsushi Yoshida, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 17/225,555

(22) Filed: Apr. 8, 2021

(65) Prior Publication Data

US 2021/0400309 A1   Dec. 23, 2021

Related U.S. Application Data

(63) Continuation of application No. PCT/JP2019/039363, filed on Oct. 4, 2019.

(30) Foreign Application Priority Data

Oct. 12, 2018   (JP) .............................. JP2018-193038

(51) Int. Cl.
*H04N 19/80* (2014.01)
*H04N 19/105* (2014.01)
*H04N 19/172* (2014.01)
*H04N 19/182* (2014.01)
*H04N 19/46* (2014.01)

(52) U.S. Cl.
CPC ........... *H04N 19/80* (2014.11); *H04N 19/105* (2014.11); *H04N 19/172* (2014.11); *H04N 19/182* (2014.11); *H04N 19/46* (2014.11)

(58) Field of Classification Search
CPC .... H04N 19/80; H04N 19/105; H04N 19/172; H04N 19/182; H04N 19/46
See application file for complete search history.

(56) References Cited

U.S. PATENT DOCUMENTS

2012/0213284 A1* 8/2012 Chen .................... H04N 19/157
375/240.16

FOREIGN PATENT DOCUMENTS

JP   2008-245135 A   10/2008

\* cited by examiner

*Primary Examiner* — Kyle M Lotfi
(74) *Attorney, Agent, or Firm* — Nath, Goldberg & Meyer; Jerald L. Meyer

(57) ABSTRACT

A phase information generator generates phase information indicating a phase an interpolation-frame. An extracted pixel determination unit generates first and second motion vector crossing pixels at which the motion vector detected for generating an interpolation-pixel intersects with the first and second frames, and determines extracted pixels based on the motion vector crossing pixels. An interpolation-phase selector selects an interpolation phase based on the phase information and whether or not the first and second motion vector crossing pixels are out of an effective pixel range. An interpolation-pixel generator generates the interpolation-pixel based on the first and second extracted pixels and the interpolation phase.

5 Claims, 14 Drawing Sheets

FIG. 14

| SELECTED INTERPOLATION-PHASE | flg0 | flg1 | PHASE DIFFERENCE BETWEEN REAL FRAME AND INTERPOLATION-FRAME fi |
|---|---|---|---|
| f0 AND f1, TWO-SIDED INTERPOLATION | 0 | 0 | — |
| f0 AND f1, TWO-SIDED INTERPOLATION | 1 | 1 | — |
| f1 ONLY, ONE-SIDED INTERPOLATION | 1 | 0 | $(1-d) > th$ |
| f0 AND f1, TWO-SIDED INTERPOLATION | 1 | 0 | $(1-d) \leqq th$ |
| f0 ONLY, ONE-SIDED INTERPOLATION | 0 | 1 | $d > th$ |
| f0 AND f1, TWO-SIDED INTERPOLATION | 0 | 1 | $d \leqq th$ |

INTERPOLATION-FRAME GENERATION DEVICE AND METHOD

CROSS REFERENCE TO RELATED APPLICATIONS

This application is a continuation application of International Application No. PCT/JP2019/039363, now WO2020/075649, filed on Oct. 4, 2019, which claims priority to Japanese Patent Application No. 2018-193038, filed on Oct. 12, 2018, the entire contents of which are incorporated by reference herein.

BACKGROUND

In recent years, a video processing apparatus such as a television generally performs so-called frame rate conversion which outputs an input video with an interpolation-frame inserted between frames of the input video. In this way, by outputting at a high frame rate with respect to the input frame rate, it is possible to provide a smooth and less blurred video. A motion vector between frames is estimated from the difference between consecutive frames of the input video, and an interpolation-frame to be inserted is generated from the motion vector and the preceding and succeeding frames (see Japanese Patent Application Laid-Open Application No. 2008-245135 (Patent Literature 1)).

SUMMARY

The generation of interpolated pixels in an interpolation-frame requires pixels of both of a pair of real frames, which are selected based on a motion vector. However, a pixel selected based on the motion vector may be located in an area out of an effective pixel range of the real frame. In such a case, it is necessary to generate interpolation-pixels by taking some measures.

The method described in Patent Literature 1 is so-called one-sided interpolation in which interpolation-pixels are generated using pixels of a real frame located only in an effective pixel range, among pixels of both of a pair of real frames selected based on a motion vector. That is, an appropriate interpolation-pixel is generated if a motion vector is properly detected, otherwise a visual discomfort is increased if a motion vector is erroneously detected because of the difficulty to detect the proper motion vector at the end of the frame.

A present embodiment is to provide an interpolation-frame generation device and an interpolation-frame generation method capable of generating interpolation-pixels with less visual discomfort even when a pixel selected for generating interpolation-pixels based on a motion vector is located in an area out of an effective pixel range of a real frame.

An aspect of one or more embodiments provides an interpolation-frame generation device including: a phase information generator configured to generate phase information indicating a phase of an interpolation-frame to be interpolated between a first frame and a second frame adjacent to each other in a time direction in a video signal; an extracted pixel determination unit configured to generate a first motion vector crossing pixel at which the motion vector detected for generating an interpolation-pixel in the interpolation-frame intersects with the first frame, generate a second motion vector crossing pixel at which the motion vector intersects with the second frame, determine a first extracted pixel based on the first motion vector crossing pixel, and determine a second extracted pixel based on the second motion vector crossing pixel; an interpolation-phase selector configured to select an interpolation phase based on the phase of the interpolation-frame determined by the phase information and whether or not the first and second motion vector crossing pixels are out of an effective pixel range; an interpolation-pixel generator configured to generate the interpolation-pixel based on the first and second extracted pixels and the interpolation phase.

An aspect of one or more embodiments provides an interpolation-frame generation method including: generating phase information indicating a phase of an interpolation-frame to be interpolated between a first frame and a second frame adjacent to each other in a time direction in a video signal; generating a first motion vector crossing pixel at which the motion vector detected for generating an interpolation-pixel in the interpolation-frame intersects with the first frame; generating a second motion vector crossing pixel at which the motion vector intersects with the second frame; determining a first extracted pixel based on the first motion vector crossing pixel; determining a second extracted pixel based on the second motion vector crossing pixel; selecting an interpolation phase based on the phase of the interpolation-frame determined by the phase information and whether or not the first and second motion vector crossing pixels are out of an effective pixel range; and generating the interpolation-pixel based on the first and second extracted pixels and the interpolation phase.

According to the embodiment, it is possible to provide an interpolation-frame generation device and an interpolation-frame generation method capable of generating interpolation-pixels with less visual discomfort even when a pixel selected based on a motion vector is located in an area out of an effective pixel range of a real frame.

BRIEF DESCRIPTION OF THE DRAWINGS

FIG. 14 is a table showing selection conditions of interpolation-phase selection signals by an interpolation-phase selector 5.

DETAILED DESCRIPTION

Hereinafter, an interpolation-frame generation device and an interpolation-frame generation method according to an embodiment will be described with reference to the accompanying drawings. First, with reference to FIG. 1, the schematic configuration and operation of the frame rate converter including the interpolation-frame generation 100 according to an embodiment will be described.

Figure 1:
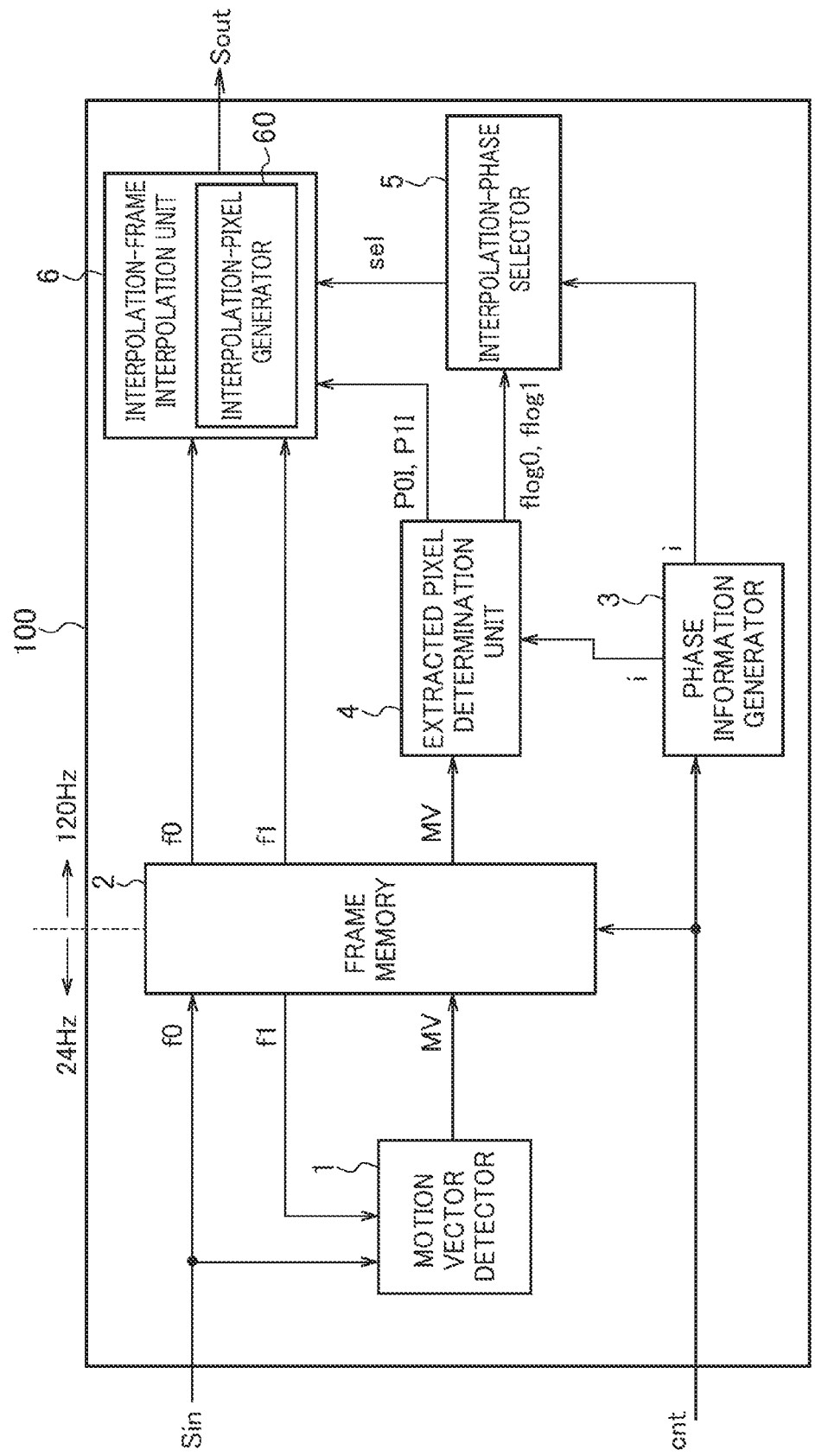
FIG. 1 is a block diagram illustrating a schematic configuration of a frame rate converter including an interpolation-frame generation device according to an embodiment.

FIG. 1 is a block diagram illustrating a schematic configuration of the interpolation-frame generation device 100 according to the present embodiment. As shown in FIG. 1, the interpolation-frame generation device 100 includes a motion vector detector 1, a frame memory 2, a phase information generator 3, an extracted pixel determination unit 4, an interpolation-phase selector 5, and an interpolation-frame interpolation unit 6. In FIG. 1, the pixel values of the pixels constituting each frame f0 (first frame) of the input video signal Sin are sequentially inputted to the motion vector detector 1 and the frame memory 2. The frame rate (frame frequency) of the input video signal Sin is, for example, 24 Hz. The frame f0 is a real frame, and is supposed to be a current frame. The frame memory 2 stores pixel values of all pixels of the frame f0.

The frame memory 2 delays the frame f0 by 1 frame period, and supplies a frame f1 (second frame) before the frame f0 to the motion vector detector 1. The 1 frame period is a period necessary for inputting all pixel values of a single frame to the frame memory 2. The frame rate of the frame f1 supplied to the motion vector detector 1 is 24 Hz. The frame f1 is a real frame. A frame memory 2 reads a frame f1 at a frame rate of 120 Hz and supplies it to an interpolation-frame interpolation unit 6. That is, the frame rate is converted by using the frame memory 2. The frame memory 2 is a transitory storage device, and may be constituted by RAM (random access memory), for example.

Although the frame rate of the frame f1 supplied to the motion vector detector 1 is different from that of the frame f1 supplied to the interpolation-frame interpolation unit 6, both frames are called frames f1 because they are signals of the same frame.

The frame f0 is delayed by the frame memory 2, converted into that with a frame rate of 120 Hz, and supplied to the interpolation-frame interpolation unit 6. A time delayed by the frame memory 2 corresponds to a time required for the motion vector detector 1 to detect the motion vector MV as described later. For example, the time delayed by the frame memory 2 can be set to a value equivalent to several tens of lines. Here, 1 line indicates the number of pixels in the horizontal direction of the input video signal Sin, and the time corresponding to 1 line indicates the time required for inputting the pixel value of 1 line to the frame memory 2.

The frame f0 input to the frame memory 2 and the frame f0 supplied to the interpolation-frame interpolation unit 6 are mutually shifted by several tens of lines in time and have different frame rates. However, both are called frames f0 because they are signals of the same frame.

A motion vector detector 1 calculates difference values between a block constituted of a plurality of pixels in a frame f0 and a block constituted of a plurality of pixels in a frame f1, and detects a motion vector MV based on a direction in which the difference value becomes small.

It should be noted that various known techniques may be used for calculating the difference value between blocks constituted of a plurality of pixels. For example, the difference value between the pixel values in the frame f0 and the pixel in the frame f1 may be calculated, the absolute value, of the difference value may be calculated, and the difference value between the blocks may be calculated by calculating the total sum of the difference values for each block.

The motion vector MV is temporarily stored in the frame memory 2, the rate thereof is converted so as to correspond to a frame having a frame rate of 120 Hz, and supplied to the extracted pixel determination unit 4. A motion vector MV outputted from a motion vector detector 1 and a motion vector MV supplied to an extracted pixel determination unit 4 have different rates, but both are the same motion vector, so that both are called motion vectors MV.

Here, the frame generated by the interpolation-frame generation device 100 in the present embodiment is referred to as an interpolation-frame f1. As described above, the frame memory 2 reads out the frames f0 and f1 at a frame rate of 120 Hz, and supplies these frames to the interpolation-frame interpolation unit 6. Therefore, when the phase difference between the frame f0 and the frame f1 is set to 1, the interpolation-frame interpolation unit 6 inserts four interpolation-frames fi having different phases by 0.2 between the frames f0 and f1 to generate an output video signal Sout having a frame rate of 120 Hz.

Figure 2:
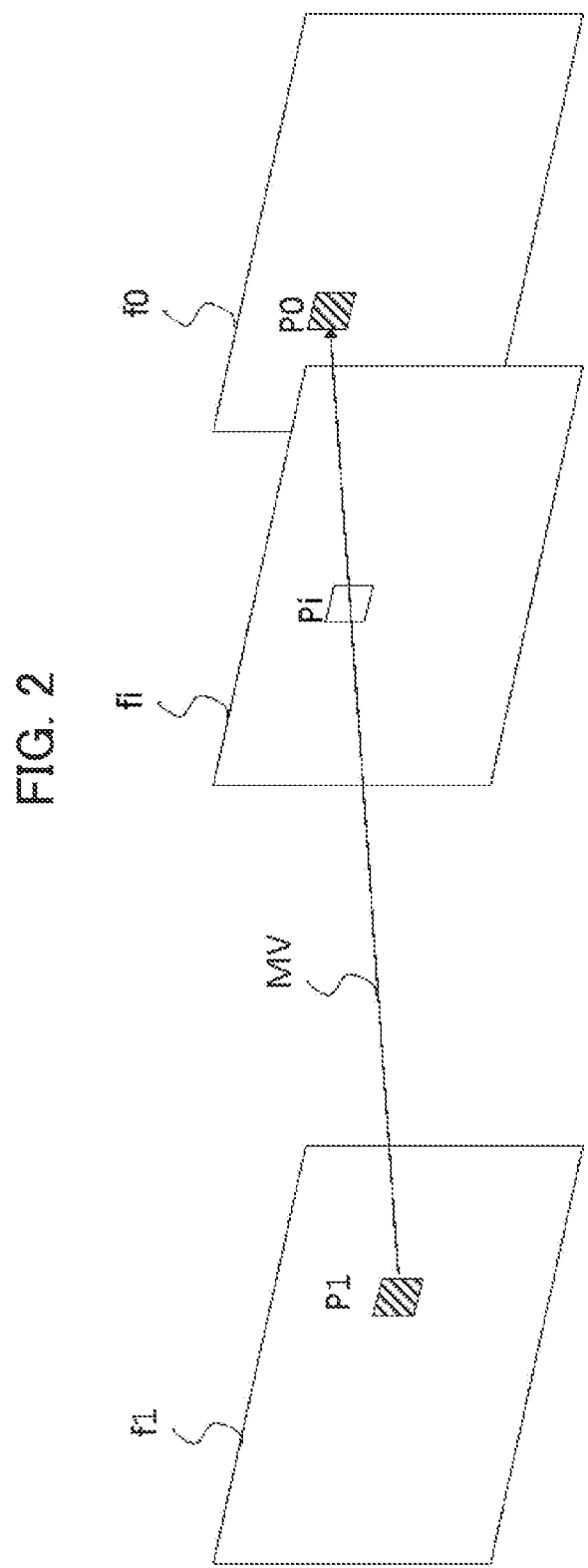
FIG. 2 is a diagram illustrating an example of a state in which pixels for generating an interpolation-pixel is located in an effective pixel range of real frames.

FIG. 2 illustrates an example in which a motion vector crossing pixel P0 and a motion vector crossing pixel P1 are located in the of pixel range. As shown in FIG. 2, a position where the frame f0 and the motion vector MV, which is detected for generating an interpolation-pixel Pi in the interpolation-frame fi, intersect on the diagram is defined as the motion vector crossing pixel P0. As shown in FIG. 2, a position where the frame f1 and the motion vector MV, which is detected for generating an interpolation-pixel Pi in the interpolation-frame fi, intersect on the diagram is defined as the motion vector crossing pixel P1.

An effective pixel range of a single frame is an area of 1920 horizontal pixels and 1080 vertical pixels, taking a full HD video signal as an example. An area out of the effective pixel range is an area out of the effective pixel range in a display area of one frame, in which a pixel capable of generating a proper interpolation-pixel Pi does not exist. Even a frame has 1920 horizontal pixels and 1080 vertical pixels, for example, it may be a letterbox-type image in which the upper and lower ends of the frame are uniformly black. When the video signal is a signal composed of such an image, the proper interpolation-pixel Pi cannot be generated using the black pixel. Therefore, when a part of the frame is a pixel of a fixed color, fixed luminance or fixed pixel value such as black, a region other than the pixel of the fixed color, fixed luminance or fixed pixel value becomes an effective pixel range.

The interpolation-frame interpolation unit 6 includes an interpolation-pixel generator 60. If the motion vector MV is supplied to the interpolation-pixel generator 60 as it is, as shown in FIG. 2, the interpolation-pixel generator 60 generates the interpolation-pixel Pi in the interpolation-frame fi using the pixel values of the motion vector crossing pixels P0 and P1.

Figure 3:
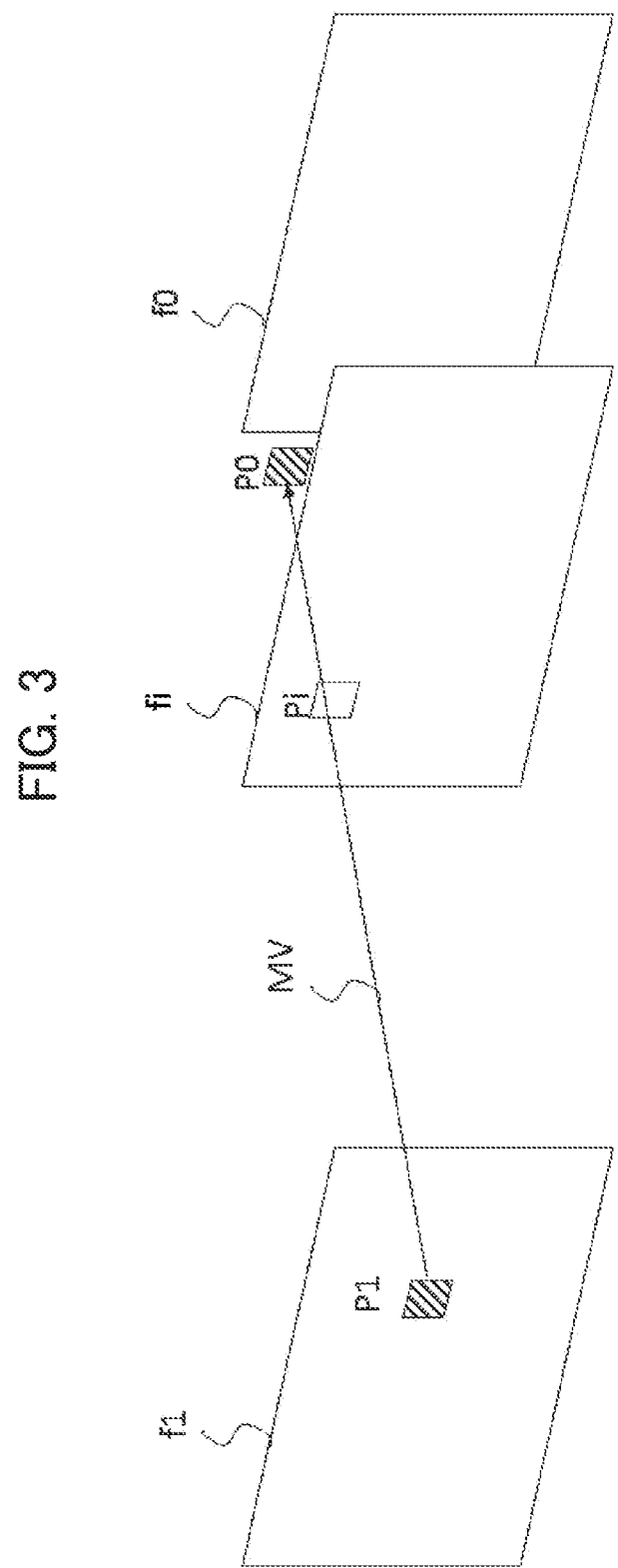
FIG. 3 is a diagram illustrating an example of a state in which a pixel for generating an interpolation-pixel is located in an area out of the effective pixel range of a real frame.

FIG. 3 illustrates an example in which the motion vector crossing pixel P0 is located in an area out of the effective pixel range of the frame f0. When the interpolation-pixel generator 60 attempts to generate the interpolation-pixel Pi by using the motion vector MV as it is, the motion vector crossing pixel P0 or P1 is located in an area out of the effective pixel range, so that the proper interpolation-pixel Pi may not be generated.

Returning again to FIG. 1, a specific configuration for generating an interpolated pixel Pi with less visual discomfort will be described even when a pixel selected based on the motion vector MV is located in a area out of the effective pixel range of the frame f0 or the frame f1.

In FIG. 1, an input timing signal cnt supplied to the frame memory 2 and the phase information generator 3. The input timing signal cnt is a signal for determining phase information i indicating a phase difference between the frame f0 and the interpolation-frame fi. The input timing signal cnt can be composed of, for example, a horizontal counter indicating a position the horizontal direction in the interpolation-frame fi and a vertical counter incremented at every timing when the horizontal counter is reset. Here, the timing at which the horizontal counter is reset means a timing at which all pixel values of an arbitrary one line in the input video signal Sin are input to the frame memory 2, and the first pixel value of the next line is input to the frame memory 2. When the vertical synchronization signal of the input video signal Sin is reset, the vertical counter resets the value to 0. The timing at which the vertical synchronization signal is reset is a timing at which. all pixel values of an arbitrary frame in the input video signal Sin are input to the frame memory 2 and the first pixel value of the next frame is input to the frame memory 2.

The phase information generator 3 Generates phase information i based on the input timing signal cnt. When the phase difference between the frame f0 and the frame f1 is set to 1, the phase information i can be a value in a range from 0 to less than 1 ($0 \leq i < 1$). For example, when the upper limit of the vertical counter is the number of vertical lines in the effective pixel range, the phase information generator 3 can generate a value which is obtained by dividing the vertical counter by the number of vertical lines in the effective pixel range as the phase information i. The phase information generator 3 supplies the generated phase information i to the extracted pixel determination unit 4 and the interpolation-phase selector 5.

The motion vector MV is supplied from the frame memory 2 to the extracted pixel determination unit 4. The phase information i is supplied from the phase information generator 3 to the extracted pixel determination unit 4. The extracted pixel determination unit 4 determines an extracted pixel P0I indicating a pixel for generating an interpolation-pixel Pi in a frame f0 and an extracted pixel P1I indicating a pixel for generating an interpolation-pixel Pi in a frame f1, based on the motion vector MV and phase information i.

Figure 4:
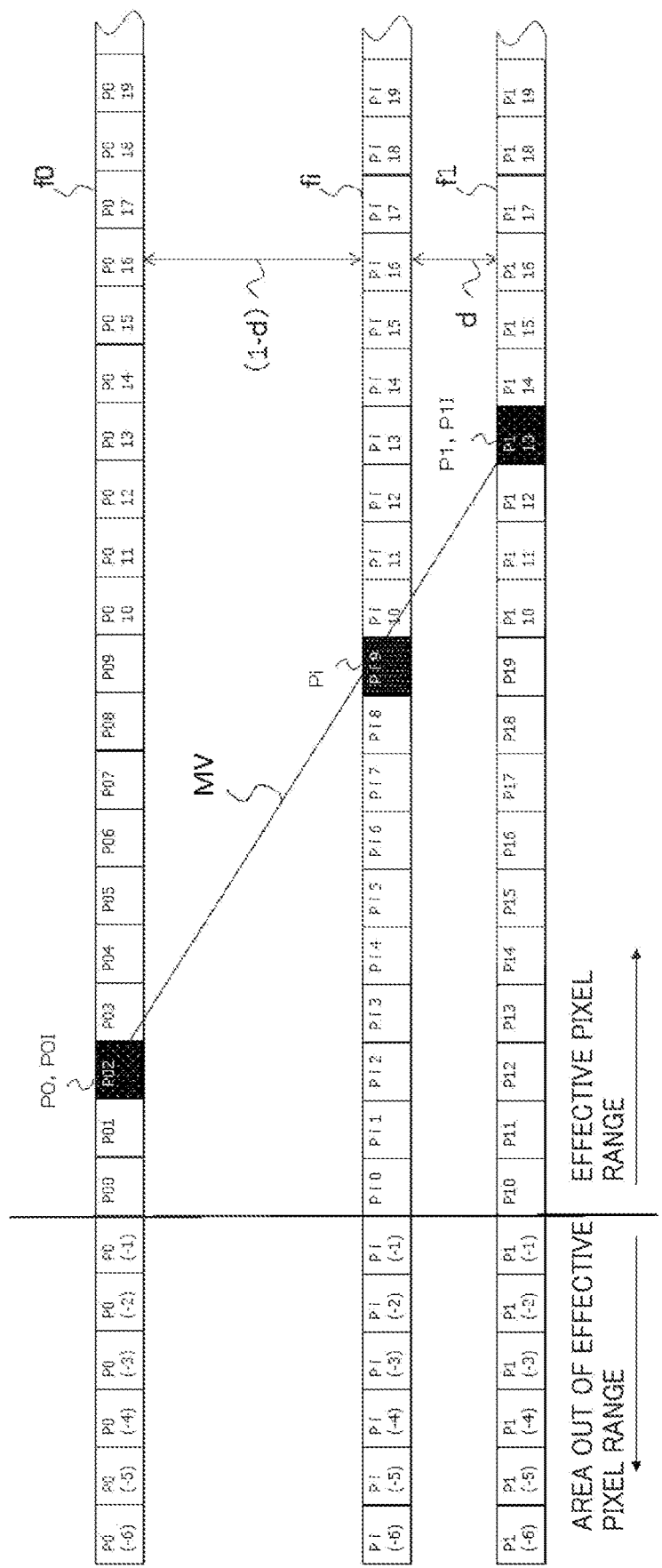
FIG. 4 is a diagram illustrating an example of an operation of the extracted pixel determination unit.

FIG. 4 illustrates the operation of the extracted pixel determination unit 4 when the motion vector crossing pixel P0 and the motion vector crossing pixel P1 are located in the effective pixel range. As shown in FIG. 4, the extracted pixel determination unit 4 calculates a phase of the interpolation-frame fi whose phase difference from the frame f1 is the same value d as the value of the phase information I, and whose phase difference from the frame f0 is a value obtained by subtracting the value of the phase information i from 1 (i.e. (1−d)). Here, the phase difference between the phase of the frame f0 and the phase of the frame f1 is set to 1.

As shown in FIG. 4, the extracted pixel determination unit 4 calculates a motion vector crossing pixel P0 at which the frame f0 and the motion vector MV detected for generating the interpolation-pixel Pi cross each other. The extracted pixel determination unit 4 calculates a motion vector crossing pixel P1 at which a frame f1 and a motion vector MV detected for generating an interpolation-pixel Pi cross each other.

The extracted pixel determination unit 4 generates an effective pixel out-of-range flag flg0 as a signal indicating whether or not the motion vector crossing pixel P0 is located in an area out of the effective pixel range. The extracted pixel determination unit 4 generates an effective pixel out-of-range flag flg1 as a signal indicating whether or not the motion vector crossing pixel P1 is located in an area out of the effective pixel range. When the value of the effective pixel out-of-range flag flg0 is 0, it indicates that the motion vector crossing pixel P0 is located in the effective pixel range. When the value of the effective pixel out-of-range flag flg0 is 1, it indicates that the motion vector crossing pixel P0 is located in the area out of the effective pixel range. When the value of the effective pixel out-of-range flag flg1 is 0, it indicates that the motion vector crossing pixel P1 is located in the effective pixel range. When the value of the effective pixel out-of-range flag flg1 is 1, it indicates that the motion vector crossing pixel P1 is located in the area out of the effective pixel range.

When the motion vector crossing pixel P0 is a pixel P02 of the effective pixel range as shown in FIG. 4, the extracted pixel determination unit 4 sets the value of the effective pixel out-of-range flag flg0 to 0 indicating the effective pixel range, and determines the pixel P02 as the extracted pixel P0I.

Figure 5:
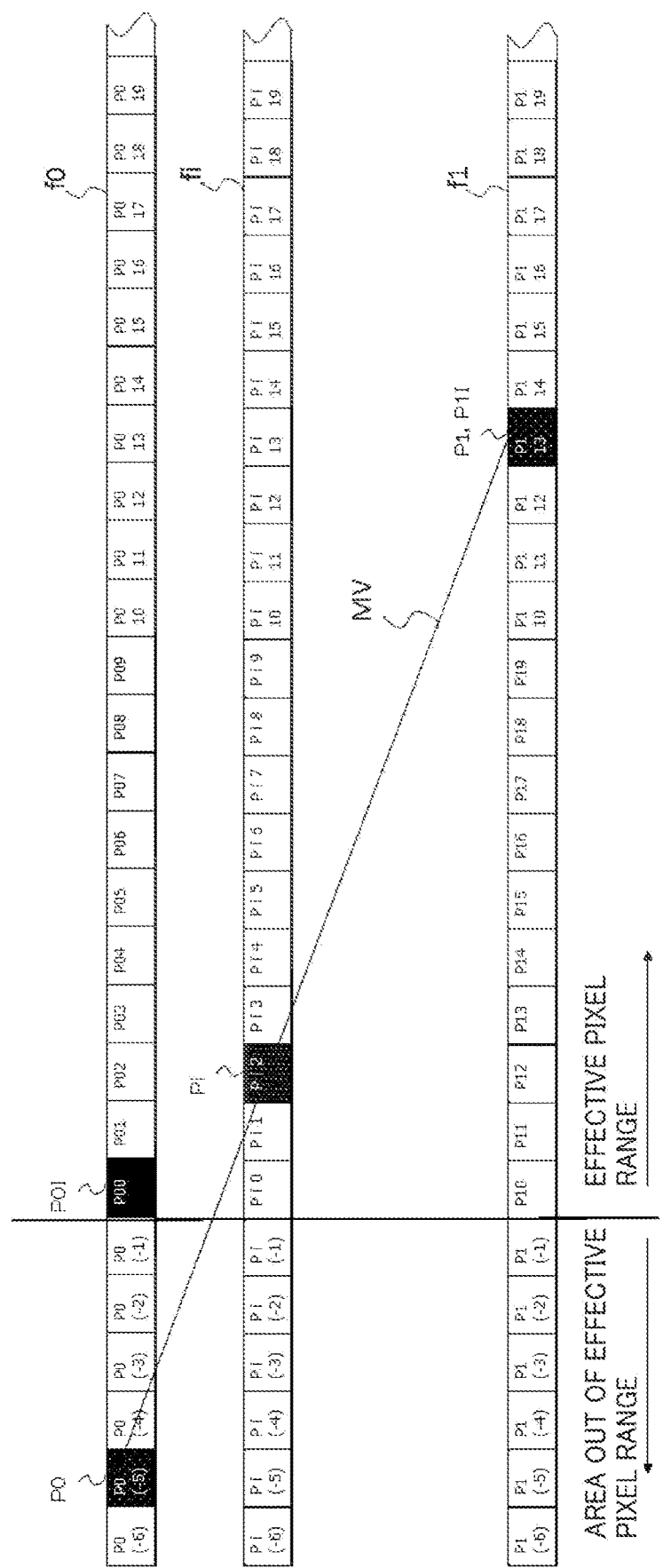
FIG. 5 is a diagram illustrating an example of an operation of the extracted pixel determination unit.

FIG. 5 illustrates an example of the operation of the extracted pixel determination unit 4 when the motion vector crossing pixel P0 is located in the area out of the effective pixel range and the motion vector crossing pixel P1 is located in the effective pixel range. As shown in FIG. 5, when the motion vector crossing pixel P0 is located at the position P0(−5) in the area out of the effective pixel range, the extracted pixel determination unit 4 determines the extracted pixel P0I at a predetermined position in the effective pixel range of the frame f0, and sets the value of the effective pixel out-of-range flag flg0 to 1 indicating the area out of the effective pixel range.

For example, as shown in FIG. 5, the extracted pixel determination unit 4 sets a pixel P00 at which a motion vector MV having only a horizontal component and the outline of the effective pixel range intersect as a predetermined pixel in the effective pixel range of the frame f0, and determines the pixel P00 as an extracted pixel P0I.

Figure 6:
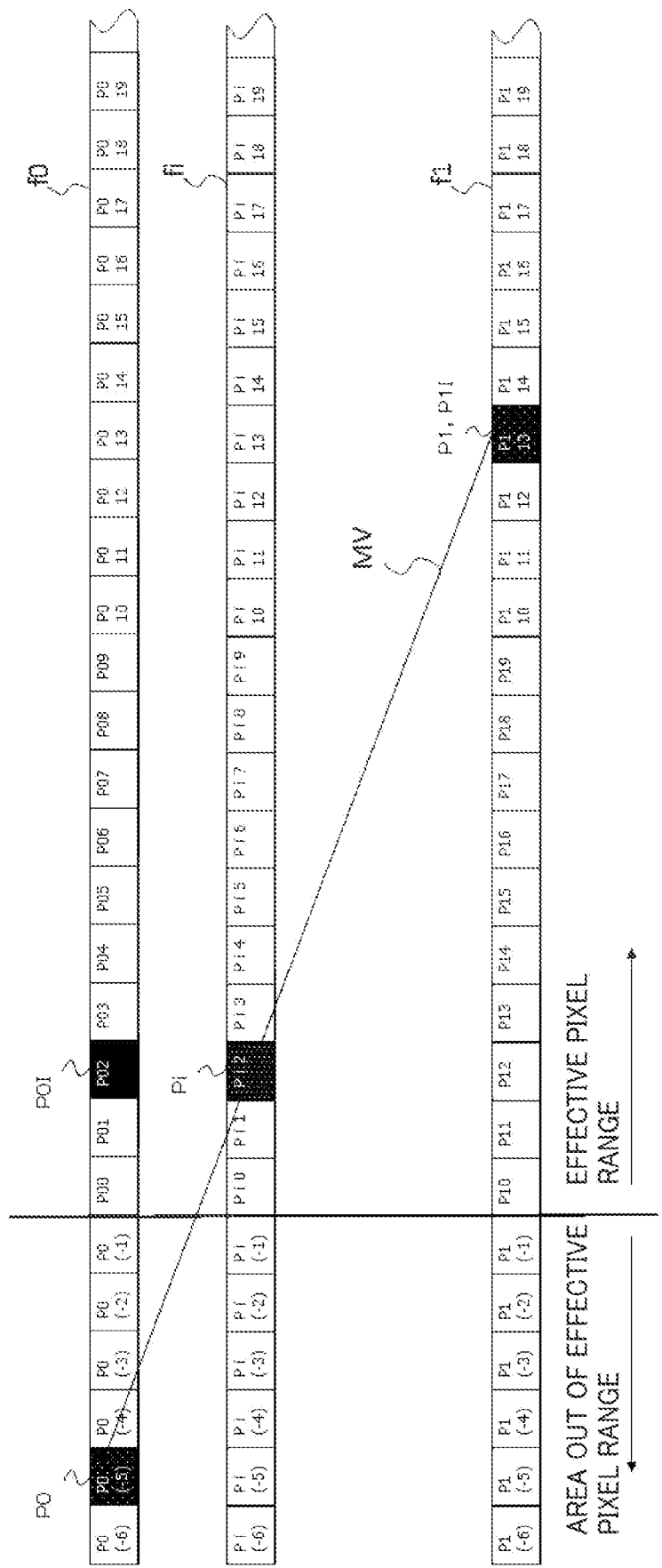
FIG. 6 is a diagram illustrating an example of an operation of the extracted pixel determination unit.

FIG. 6 illustrates a further example of the operation of the extracted pixel determination unit 4 when the motion vector crossing pixel P0 is located in the area out of the effective pixel range and the motion vector crossing pixel P1 is located in the effective pixel range. For example, as shown in FIG. 6, the extracted pixel determination unit 4 sets the pixel P02 of the frame f0 located at the same position as the interpolation-pixel Pi as the predetermined pixel in the effective pixel range of the frame f0, and determines the pixel P02 as the extracted pixel P0I. The extracted pixel determination unit 4 may determine a pixel different from the aforementioned pixel P00 or the like as the predetermined pixel in the effective pixel range of the frame f0.

As shown in FIG. 4, when the motion vector crossing pixel P1 is a pixel P 113 in the effective pixel range, the extracted pixel determination unit 4 sets the value of the effective pixel out-of-range flag flg1 to 0 indicating the effective pixel range, and determines the pixel P 113 as the extracted pixel P1I.

Figure 7:
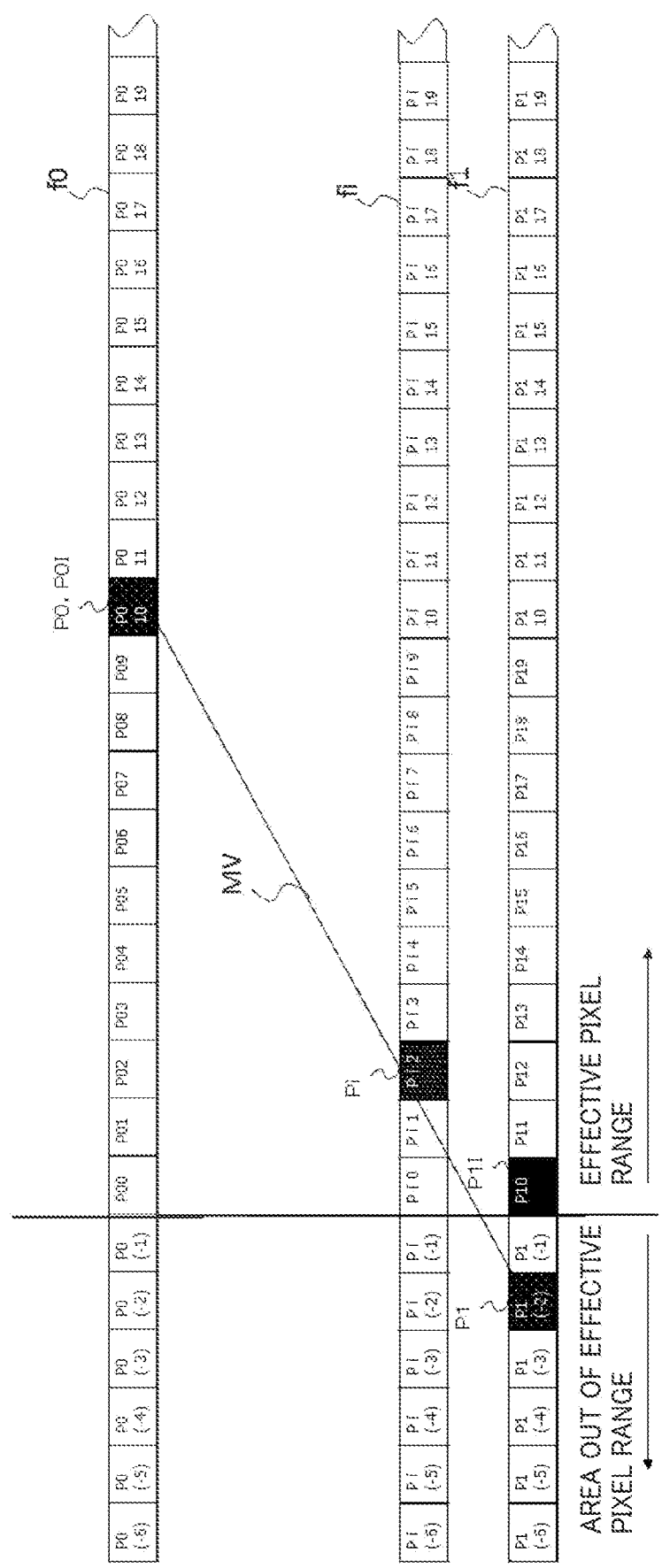
FIG. 7 is a diagram illustrating an example of an operation of the extracted pixel determination unit.

FIG. 7 illustrates an example of the operation of the extracted pixel determination unit 4 when the motion vector crossing pixel P0 is located in the effective pixel range and the motion vector crossing pixel P1 is located in the area out of the effective pixel range. As shown in FIG. 7, when the motion vector crossing pixel P1 is a pixel P1(−2) in the area out of the effective pixel range, the extracted pixel determination unit 4 determines the extracted pixel P1I as the predetermined pixel in the effective pixel range of the frame f1, and sets the value of the effective pixel out-of-range flag flg1 to 1 indicating the area out of the effective pixel range.

For example, as shown in FIG. 7, the extracted pixel determination unit 4 sets a pixel P10 at which a motion vector MV having only a horizontal component intersects with the outline of the effective pixel range as the predetermined pixel in the effective pixel range of the frame f1, and determines the pixel P10 as an extracted pixel P1I.

Figure 8:
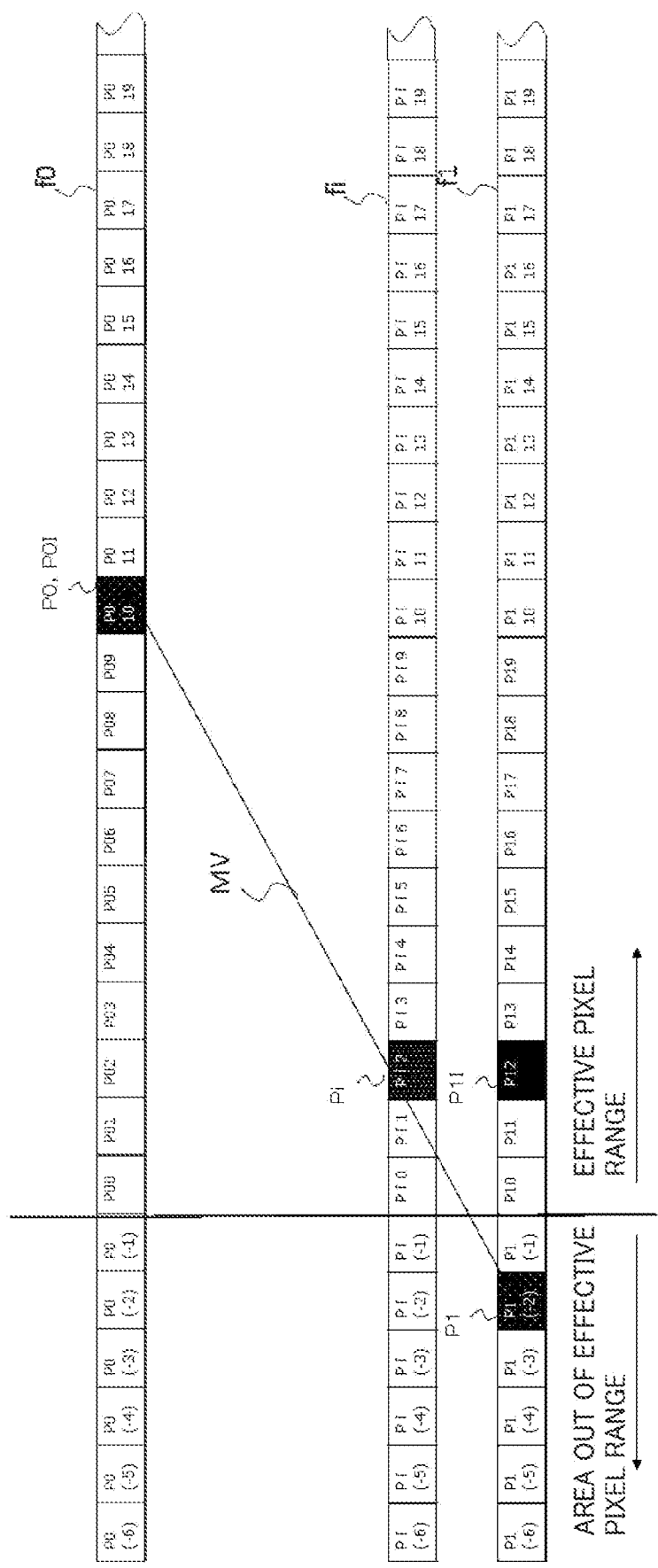
FIG. 8 is a diagram illustrating an example of an operation of the extracted pixel determination unit.

FIG. 8 illustrates a further example of the operation of the extracted pixel determination unit 4 when the motion vector crossing pixel P0 is located in the effective pixel range and the motion vector crossing pixel P1 is located in the area out of the effective pixel range. For example, as shown in FIG. 8, the extracted pixel determination unit 4 sets the pixel P12 of the frame f1 located at the same position as the interpolation-pixel Pi as the predetermined pixel in the effective pixel range of the frame f1, and determines the pixel P12 as the extracted pixel P1I. The extracted pixel determination unit 4 may determine a pixel different from the aforementioned pixel P10 or the like as the predetermined pixel in the effective pixel range of the frame f1.

As shown in FIGS. 4 to 8, only the case where the motion vector MV has only the horizontal component has been described as the explanation of the extracted pixel determination unit 4. However, the motion vector detector 1 detects a motion vector MV having only the vertical component. Otherwise, the motion vector detector 1 detects a motion vector MV having horizontal and vertical components. Even when the motion vector MV has only a component in the vertical direction or has components in the horizontal direction and the vertical direction, the extracted pixel determination unit 4 may set a pixel at an edge of the effective pixel range through which the motion vector MV passes as the predetermined pixel in the effective pixel range. The pixel at the edge of the effective pixel range through which the motion vector MV passes is a pixel where the motion vector MV crosses the outline of the effective pixel range.

The extracted pixel P0I determined by the extracted pixel determination unit 4 can be composed of horizontal and vertical vectors indicating the position of the extracted pixel in the frame f0 with the interpolation-pixel Pi as a reference. The extracted pixel P1I determined by the extracted pixel determination unit 4 can be composed of horizontal and vertical vectors indicating the position of the extracted pixel in the frame f1 with the interpolation-pixel Pi as a reference.

The extracted pixel determination unit 4 supplies the determined extracted pixels P0I and P1I to the interpolation-pixel generator 60, as extracted pixel signals. The extracted pixel determination unit 4 supplies the set effective pixel out-of-range flags flg0 and flg1 to the interpolation-phase selector 5, as effective pixel out-of-range signals.

The phase information i is supplied from the phase information generator 3 to the interpolation-phase selector 5. The effective pixel out-of-range flags flg0 and flg1 are supplied from the extracted pixel determination unit 4, as effective pixel out-of-range signals. As shown in FIG. 4, the interpolation-phase selector 5 calculates the phase of the interpolation-frame fi whose phase difference from the frame f1 is the same value d as the value of the phase information I, and whose phase difference from the frame f0 is the value obtained by subtracting the value of the phase information i from 1 (i.e. (1−d)). Here, the phase difference between the phase of the frame f0 and the phase of the frame f1 is set to 1. A frame including a pixel used for interpolation is defined as an interpolation phase, and an interpolation-phase selector 5 selects the interpolation phase.

Figure 9:
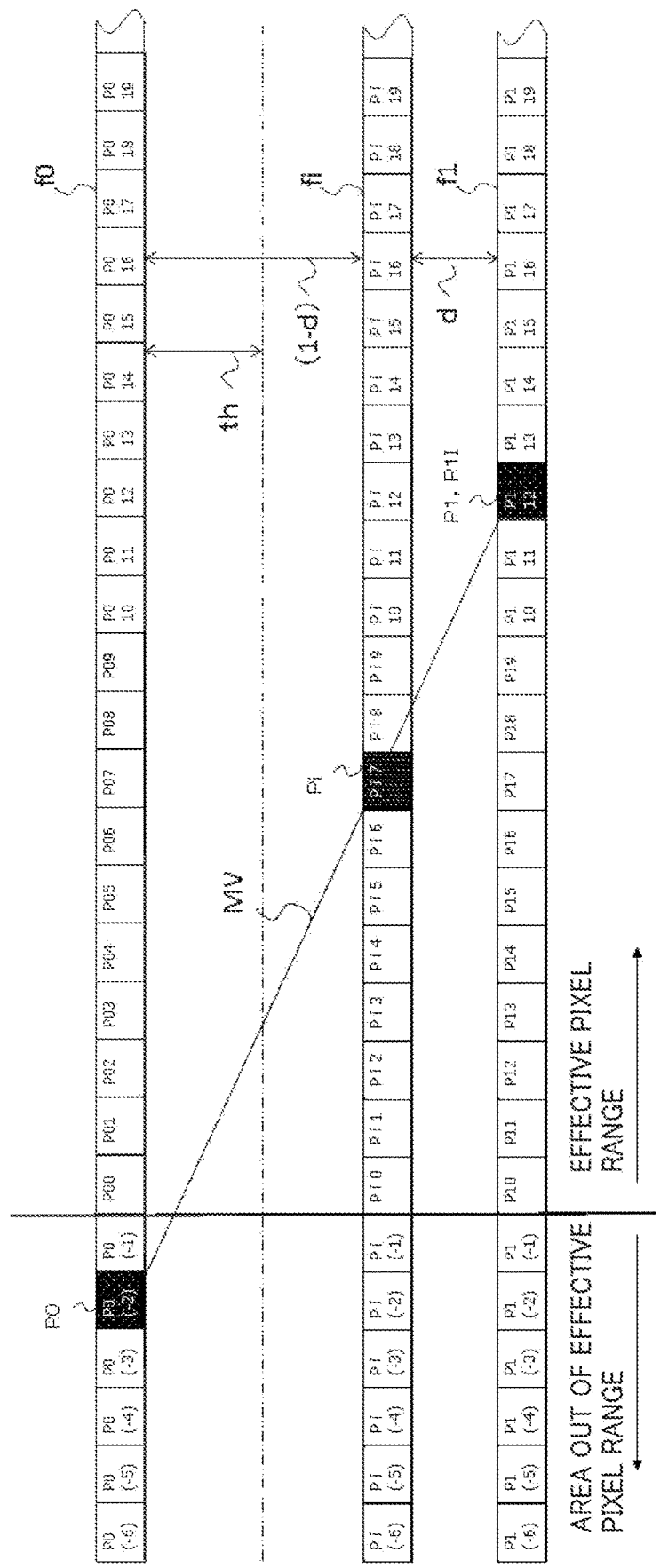
FIG. 9 is a diagram illustrating an example of the operation of the interpolation-phase selector.

FIG. 9 illustrates an example of the operation of the interpolation-phase selector 5 when the motion vector crossing pixel P0 is located in the area out of the effective pixel range and the motion vector crossing pixel P1 is located in the effective pixel range. FIG. 14 is a table showing selection conditions of the interpolation-phase selection signal sel of the interpolation-phase selector 5. FIGS. 9 and 14 show a following case: The value of the effective pixel out-of-range flag flg0 is 1 indicating an area out of the effective pixel range, the value of the effective pixel out-of-range flag flg1 is 0 indicating an effective pixel range, and the phase difference (1−d) between the frame f0 having a flag representing an area out of the effective pixel range and the interpolation-frame fi is larger than a threshold th (i.e. (1−d)>th). In this case, the interpolation-phase selector 5 selects only the frame f1 as the interpolation phase.

Figure 10:
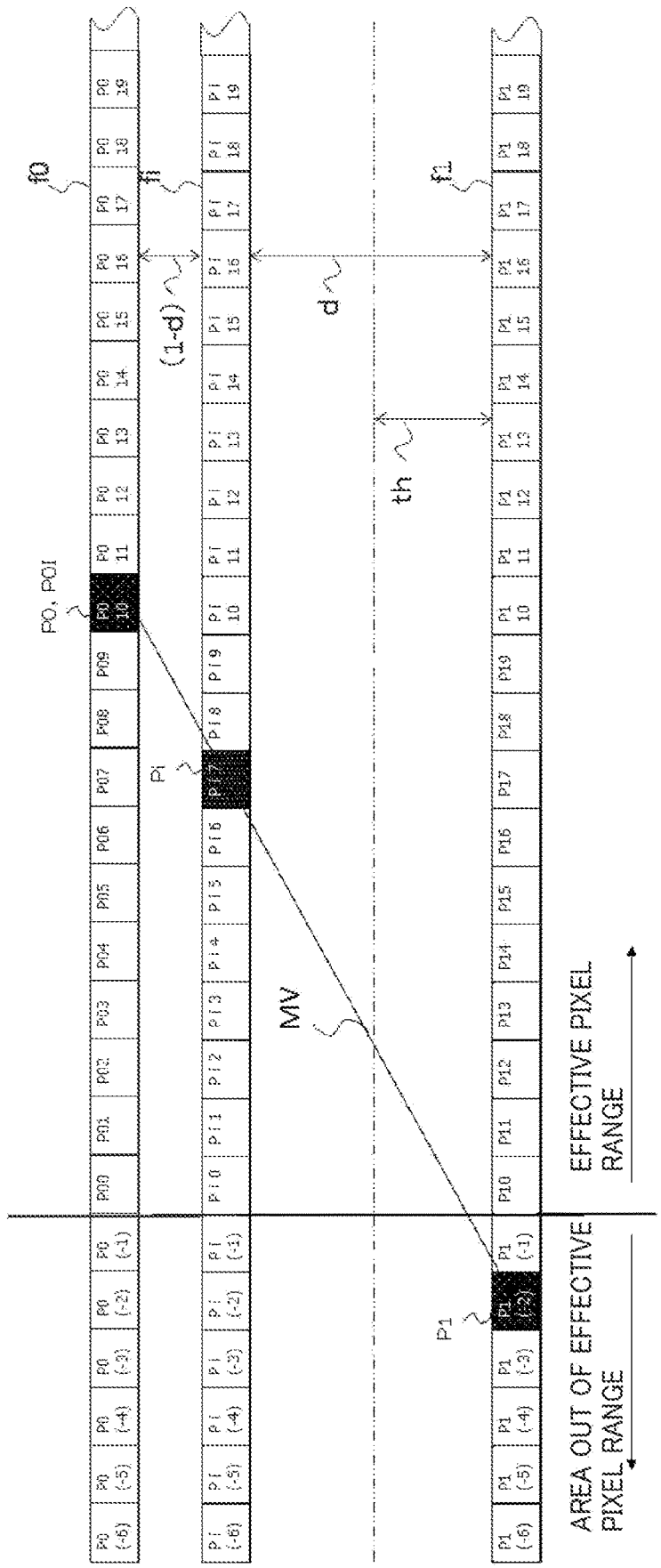
FIG. 10 is a diagram illustrating an example of an operation of the interpolation-phase selector.

FIG. 10 illustrates an example of the operation of the interpolation-phase selector 5 when the motion vector crossing pixel P0 is located in the effective pixel range and the motion vector crossing pixel P1 is located in the area out of the effective pixel range. FIGS. 10 and 14 show a case where the value of the effective pixel out-of-range flag flg0 is 0 indicating the effective pixel range, the value of the effective pixel out-of-range flag flg1 is 1 indicating the area out of the effective pixel range, and the phase difference d between the frame f1 having the flag representing the area out of the effective pixel range and the interpolation-frame fi is larger than the threshold (d>th). In this case, the interpolation-phase selector 5 selects only the frame f0 as the interpolation phase.

In all other cases, as shown in FIG. 14, the interpolation-phase selector 5 selects both the frame f0 and the frame f1 as interpolation phases.

Figure 11:
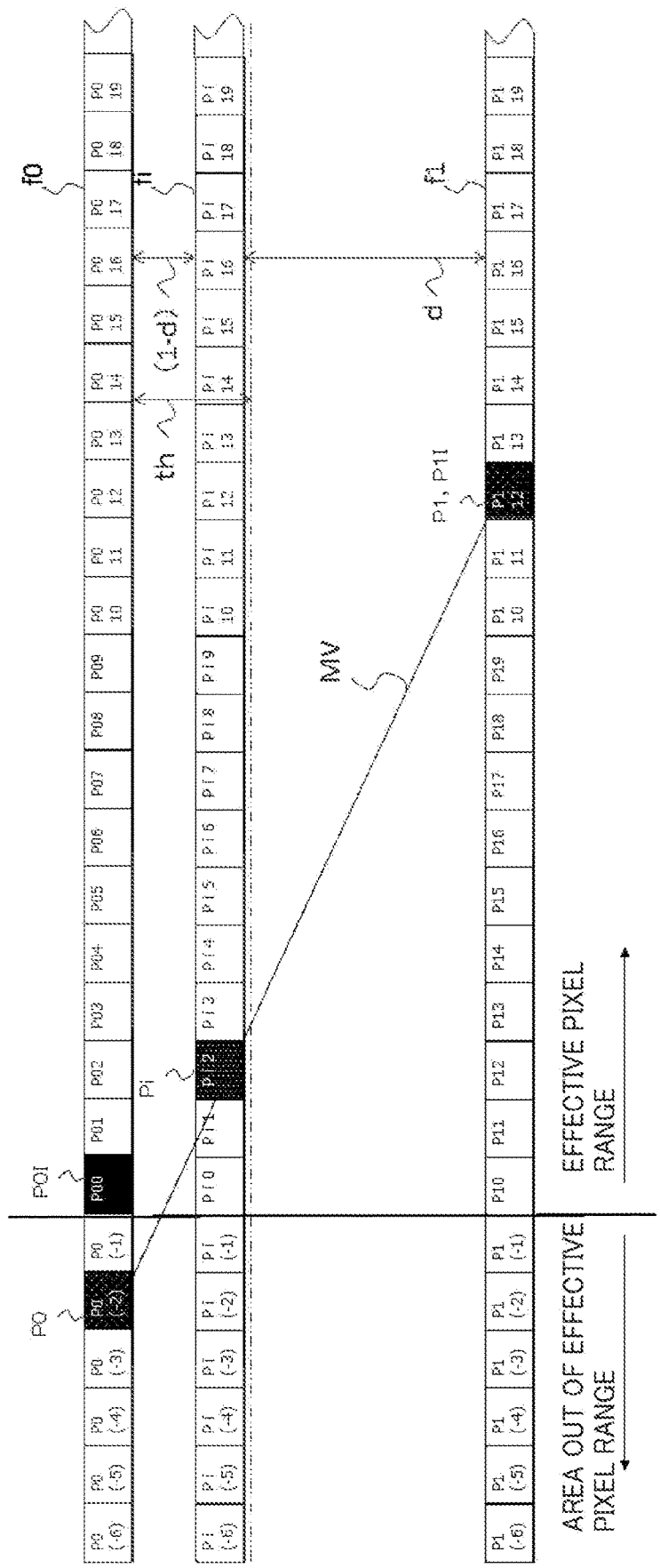
FIG. 11 is a diagram illustrating an example of an operation of the interpolation-phase selector.

FIG. 11 illustrates a further example of the operation of the interpolation-phase selector 5 when the motion vector crossing pixel P0 is located in the area out of the effective pixel range and the motion vector crossing pixel P1 is located in the effective pixel range. FIGS. 11 and 14 show a case where the value of the effective pixel out-of-range flag flg0 is 1 indicating the area out of the effective pixel range, the value of the effective pixel out-of-range flag flg1 is 0 indicating an effective pixel range, and the phase difference (1−d) between the frame f0 having a flag representing the area out of the effective pixel range and. the interpolation-frame fi is smaller than the threshold th (i.e. (1−d)<th). In this case, the interpolation-phase selector 5 selects both the frame f0 and the frame f1 as interpolation phases.

Figure 12:
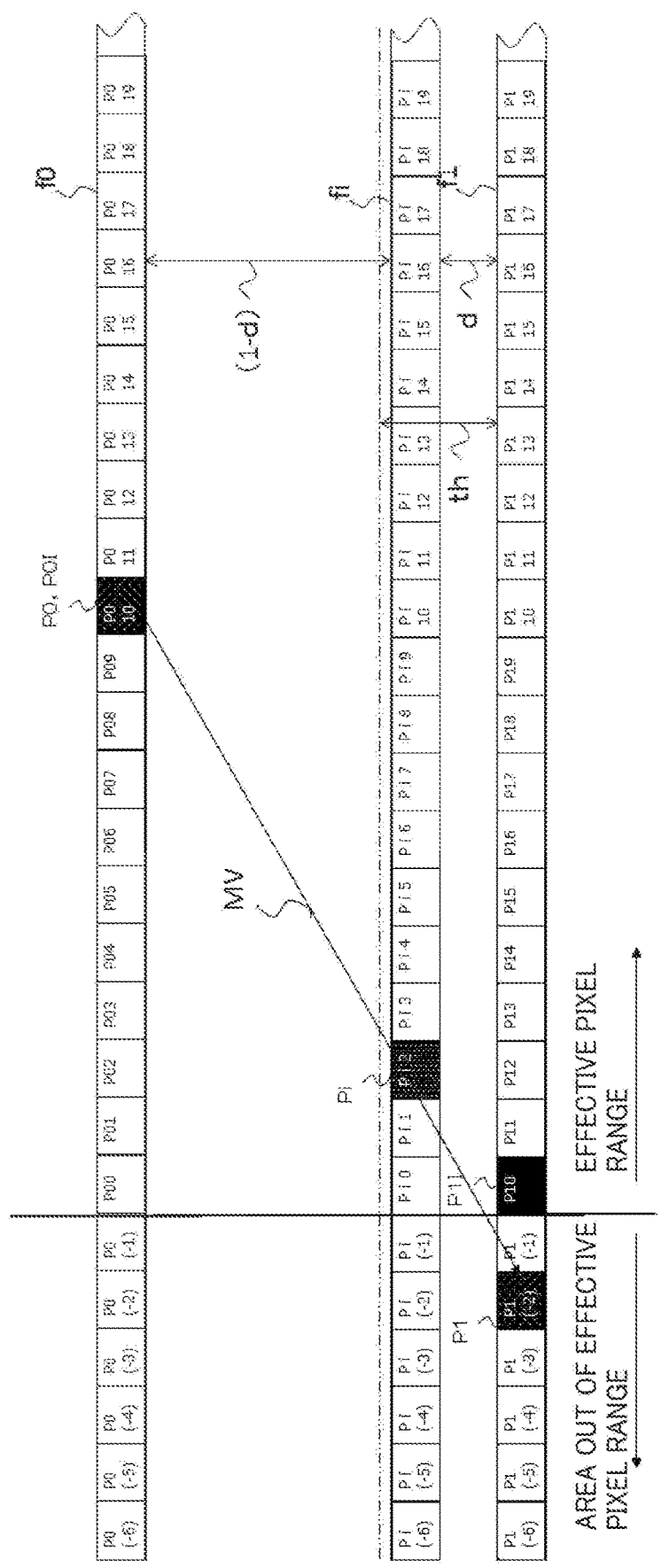
FIG. 12 is a diagram illustrating an example of an operation of the interpolation-phase selector.

FIG. 12 illustrates a further example of the operation of the interpolation-phase selector 5 when the motion vector crossing pixel P0 is located in the effective pixel range and the motion vector crossing pixel P1 is located in the area out of the effective pixel range. FIGS. 12 and 14 show a case where the value of the effective pixel out-of-range flag flg0 is 0 indicating the effective pixel range, the value of the effective pixel out-of-range flag flg1 is 1 indicating the area out of the effective pixel range, and the phase difference d between the frame f1 having the flag representing the area out of the effective pixel range and the interpolation-frame fi is larger than the threshold th (d<th). In this case, the interpolation-phase selector 5 selects both the frame f0 and the frame f1 as interpolation phases.

FIGS. 4 and 14 show the case where the value of the effective pixel out-of-range flag flg0 is 0 indicating the effective pixel range and the value of the effective pixel out-of-range flag flg1 is 0 indicating the effective pixel range. In this case, the interpolation-phase selector 5 selects both the frame f0 and the frame f1 as interpolation phases.

The threshold th which is compared with the phase difference between the actual frame and the interpolation-frame fi by the interpolation-phase selector 5 can be set in a range from 0 to less than 1 (0≤i<1). In order to reduce visual discomfort caused by using pixels having low correlation for interpolation, it is desirable to set the threshold value th to a value smaller than 0.5. When a film footage, which is an original image at a frame rate of 24 Hz, is converted to a video with a frame rate of 60 Hz by 2-3 pull-down processing or the like, and further converted to a video with a frame rate of 120 Hz by a frame interpolation technique or the like, the phase difference between the frame of the original mage and the interpolation-frame closest to the original image is 0.2. Therefore, the visual discomfort can be further reduced by setting the threshold value th to 0.2. Here, the phase difference between the phase of the frame f0 and the phase of the frame f1 is set to 1.

The threshold value th which is compared with the phase difference between the actual frame and the interpolation-frame fi by the interpolation-phase selector 5 may vary depending on factors such as the reliability of the motion vector MV or the degree of variation of the histogram within one frame of the motion vector MV. The reliability of the motion vector MV may be set to be lower as the magnitude of the motion vector MV becomes greater, for example. The reliability of the mot on vector MV may be obtained by using other known techniques. The degree of variation of the histogram within one frame of the motion vector MV may be obtained by using statistical values such as variance and standard deviation.

The interpolation-phase selector 5 selects, as the interpolation-phase selection signal sel, any one of a signal having only the frame f0 as the interpolation phase, a signal having only the frame f1 as the interpolation phase, or a signal having both the frame f0 and the frame f1 as the interpolation phase. The interpolation-phase selector 5 supplies the interpolation-phase selection signal sel to the interpolation-pixel generator 60.

The extracted pixel signals P0I and P1I are supplied from the extracted pixel determination unit 4 to the interpolation-pixel generator 60. The interpolation-phase selection signal sel is supplied from the interpolation-phase selector 5 to the interpolation-pixel generator 60. The interpolation-pixel generator 60 generates each interpolation-pixel Pi in an interpolation-frame fi based on the extracted pixel signal P0I, the extracted pixel signal P1I and the interpolation-phase selection signal sel.

When the frame f0 and the frame f1 served as the interpolation phases shown in FIGS. 4, 11, and 12 are selected as the interpolation-phase selection signal sel, the interpolation-pixel generator 60 mixes the pixel value of the extracted pixel signal P0I with the pixel value of the extracted pixel signal P1I and generates an interpolation-pixel Pi.

When only the frame f1 shown in FIG. 9 serving as the interpolation phase is selected as the interpolation-phase selection signal sel, the interpolation-pixel generator 60 generates an interpolation-pixel Pi having the same value as the pixel value of the extracted pixel signal P1I of the frame f1.

When only the frame f0 shown in FIG. 10 serving as the interpolation phase is selected as the interpolation-phase selection signal sel, the interpolation-pixel generator 60 generates an interpolation-pixel Pi having the same value as the pixel value of the extracted pixel signal P0I of the frame f0.

The interpolation-pixel generator 60 generates all interpolation-pixels Pi in the interpolation-frame fi, thereby an interpolation-frame fi is generated.

The interpolation-frame interpolation unit 6 interpolates the interpolation-frame fi into a phase that is between the frames f0 and f1 adjacent to each other in a time direction and has a phase difference d from the frame f1.

The following can be appreciated from FIGS. 9 to 12. According to the interpolation-frame generation device 100 and the interpolation-frame generation method of the present embodiment, when a pixel selected based on a motion vector for generating an interpolation-pixel is located in an area out of the effective pixel range of the real frame, and when the distance from a phase of a pixel indicating the area out of the effective pixel range to the interpolation-frame is less than a predetermined value, the pixel selected based on a motion vector for generating an interpolation-pixel is extracted as a pixel to be used for interpolation by being replaced to a pixel in the effective pixel range. According to the interpolation-frame generation device 100 and the interpolation-frame generation method of the present embodiment, when a pixel selected based on a motion vector for generating an interpolation-pixel is located in an area out of the effective pixel range of the real frame and when the distance from a phase of the pixel indicating the area out of the effective pixel range to the interpolation-frame is the predetermined value or more, interpolation is performed using only the pixel indicating the effective pixel range. Therefore, according to the interpolation-frame generation device 100 and the interpolation-frame generating method of the embodiment, it is possible to generate interpolation-pixels having less visual discomfort.

With the flowchart shown in FIG. 13, the operation of the interpolation-frame generation device 100 according to the present embodiment and the processing by the interpolation-frame generating method executed by the interpolation-frame generation device 100 will be described again.

Figure 13:
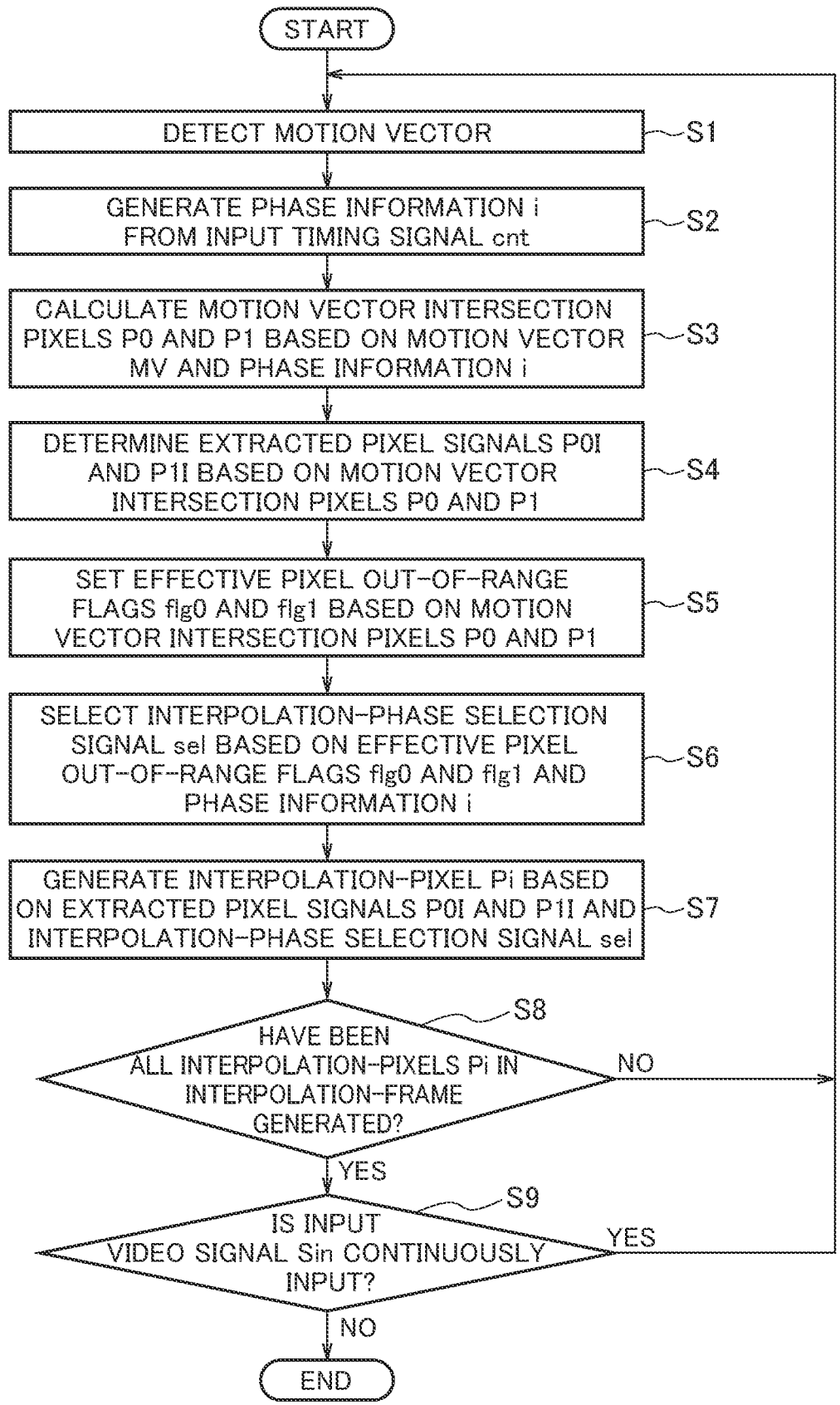
FIG. 13 is a flowchart describing an operation of the interpolation-frame generation device 100 according to an embodiment and an interpolation-frame generation method according to an embodiment.

In FIG. 13, when the input video signal Sin is supplied to the motion vector detector 1 and the processing is started, the interpolation-frame generation device 100 starts the processing to generate an interpolation-frame. In step S1, the motion vector detector 1 detects a motion vector MV for generating each interpolation-pixel Pi of each interpolation-frame fi based on the pixels of the frame f0 and the frame f1. In step S2, the phase information generator 3 generates phase information i from the input timing signal cnt.

In step S3, the extracted pixel determination unit 4 calculates motion vector crossing pixels P0 and P1 based on the motion vector MV and the phase information i. In step S4, when the motion vector crossing pixels P0 and P1 are located in the effective pixel range, the extracted pixel determination unit 4 determines the motion vector crossing pixels P0 and P1 as the extracted pixel signals P0I and P1I. In step S4, when the motion vector crossing pixels P0 and P1 are located in the area out of the effective pixel range, the extracted pixel determination unit 4 determines predetermined pixels in the effective pixel range as extracted pixel signals P0I and P1I.

In step S5, when the motion vector crossing pixels P0 and P1 are located in the of pixel range, the extracted pixel determination unit 4 sets the effective pixel out-of-range flags flg0 and flg1 of the frames having the motion vector crossing pixels P0 and P1 to 0. In step S5, when the motion vector crossing pixels P0 and P1 are located in the area out of the effective pixel range, the extracted pixel determination unit 4 sets the effective pixel out-of-range flags flg0 and flg1 of the frames having the motion vector crossing pixels P0 and P1 to 1. In steps S4 and S5, the order of processing may be changed.

In step S6, the interpolation-phase selector 5 selecting an interpolation phase by comparing the phase difference between the phases of the frames whose effective pixel out-of-range flags flg0 and flg1 indicate the area out of the effective pixel range and the phase of the interpolation-frame fi determined by the phase information i with a threshold, and generates an interpolation-phase selection signal sel.

In step S7, the interpolation-pixel generator 60 generates an interpolation-pixel Pi using the pixel values of the pixels indicated by the extracted pixel signals P0I and P1I of the interpolation phase indicated by the interpolation-phase selection signal sel. In step S8, the interpolation-pixel generator 60 determines whether all the interpolation-pixels Pi in the interpolation-frame fi have been generated. In step S8, if not all the interpolation-pixels Pi have been generated (NO in step S8), the processing of steps S1 to S7 is repeated.

If all the interpolation-pixels Pi have been generated in step S8 (YES in step S8), the interpolation-pixel generator 60 determines in step S9 whether or not the input video signal Sin is continuously input. In step S9, if the input video signal Sin is continuously input (YES in step S9), the processing of steps S1 to S8 is repeated. In step S9, if the input video signal Sin is not continuously input (NO in step S9), the interpolation-pixel generator 60 ends the interpolation-frame generation. process.

The frame rate converter (interpolation-frame generation device 100) as shown in FIG. 1 may be composed of hardware (electronic circuit), or at least part thereof may be composed of software (computer program). When the frame rate converter (interpolation-frame generation device 100) is configured, the hardware and the software can be selectively used. For example, the motion vector detector 1, the phase information generator 3, the extracted pixel determination unit 4, the interpolation-phase selector 5, and the interpolation-frame interpolation unit 6 may be composed of hardware such as ASIC (application specific integrated circuit), PLD (programmable logic device), FPGA (field programmable gate array) or the like.

The processing shown in FIG. 13 may be executed in a computer in which a CPU (Central Processing Unit) executes a computer program (frame rate conversion program or interpolation-frame generation program) loaded into the main memory. The computer program may be stored on a non-transitory storage medium or transmitted to the computer with a communication line such as the Internet or the like.

The present disclosure relates to the subject matter described in Japanese Patent Application No. 2018-193038 filed Oct. 12, 2018, all of which are incorporated herein by reference.

What is claimed is:

1. An interpolation-frame generation device comprising:
   a phase information generator configured to generate phase information indicating a phase of an interpolation-frame to be interpolated between a first frame and a second frame adjacent to each other in a time direction in a video signal;
   an extracted pixel determination unit configured to generate a first motion vector crossing pixel at which the motion vector detected for generating an interpolation-pixel in the interpolation-frame intersects with the first frame, generate a second motion vector crossing pixel at which the motion vector intersects with the second frame, determine a first extracted pixel based on the first motion vector crossing pixel, and determine a second extracted pixel based on the second motion vector crossing pixel;
   an interpolation-phase selector configured to select an interpolation phase based on the phase of the interpolation-frame determined by the phase information and whether or not the first and second motion vector crossing pixels are out of an effective pixel range;
   an interpolation-pixel generator configured to generate the interpolation-pixel based on the first and second extracted pixels and the interpolation phase.

2. The interpolation-frame generation device according to claim 1, wherein
   the interpolation-phase selector is configured to: select only the second frame as the interpolation phase when the first motion vector crossing pixel is located out of the effective pixel range and the second motion vector crossing pixel is located in the effective pixel range and the phase difference between the phase of the first frame and the phase of the interpolation-frame is larger than a predetermined value, selects only the first frame as the interpolation phase when the first motion vector crossing pixel is located in the effective pixel range and the second motion vector crossing pixel is located out of the effective pixel range and the phase difference between the phase of the second frame and the phase of the interpolation-frame is larger than the predetermined value, and select the first and second frames as the interpolation phase in other cases, and
   the interpolation-pixel generator is configured to: generate the interpolation-pixel using only the pixel value of the second extracted pixel when the interpolation-phase selector selects only the second frame as the interpolation phase, generate the interpolation-pixel using only the pixel value of the first extracted pixel when the interpolation-phase selector selects only the first frame as the interpolation phase, and generate the interpolation-pixel using the pixel value of the first extracted pixel and the pixel value of the second extracted pixel when the first and second frames are selected as the interpolation phase.

3. The interpolation-frame generation device according to claim 2, wherein
   the interpolation-phase selector is configured to set the predetermined value to a value smaller than a value obtained by dividing a phase difference between the phase of the first frame and the phase of the second frame by two.

4. The interpolation-frame generation device according to claim 1, wherein
   the extracted pixel determination unit is configured to: determine the first motion vector crossing pixel as the first extracted pixel when the first motion vector crossing pixel is in the effective pixel range, determine a predetermined pixel in the effective pixel range as the first extracted pixel when the first motion vector crossing pixel is out of the effective pixel range, determine the second motion vector crossing pixel as the second extracted when the second motion vector crossing pixel is in the effective pixel range, and determine a predetermined pixel in the effective pixel range as the second extracted pixel when the second motion vector crossing pixel is out of the effective pixel range.

5. An interpolation-frame generation method comprising:

generating phase information indicating a phase of an interpolation-frame to be interpolated between a first frame and a second frame adjacent to each other in a time direction in a video signal;

generating a first motion vector crossing pixel at which the motion vector detected for generating an interpolation-pixel in the interpolation-frame intersects with the first frame;

generating a second motion vector crossing pixel at which the motion vector intersects with the second frame;

determining a first extracted pixel based on the first motion vector crossing pixel;

determining a second extracted pixel based on the second motion vector crossing pixel;

selecting an interpolation phase based on the phase of the interpolation-frame determined by the phase information and whether or not the first and second motion vector crossing pixels are out of an effective pixel range; and generating the interpolation-pixel based on the first and second extracted pixels and the interpolation phase.

* * * * *